United States Patent
Jeuk et al.

(10) Patent No.: US 10,592,293 B2
(45) Date of Patent: Mar. 17, 2020

(54) TENANT-SPECIFIC POLICY GENERATION AND ENFORCEMENT WITHIN CONTAINERS

(71) Applicant: Cisco Technology, Inc., San Jose, CA (US)

(72) Inventors: Sebastian Jeuk, San Jose, CA (US); Gonzalo Salgueiro, Raleigh, NC (US); Rajath Agasthya, San Jose, CA (US); Rohit Agarwalla, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 210 days.

(21) Appl. No.: 15/692,824

(22) Filed: Aug. 31, 2017

(65) Prior Publication Data

US 2019/0065278 A1 Feb. 28, 2019

(51) Int. Cl.
*G06F 9/50* (2006.01)
*G06F 9/455* (2018.01)
*H04L 29/06* (2006.01)
*G06F 21/62* (2013.01)

(52) U.S. Cl.
CPC ............ *G06F 9/5077* (2013.01); *G06F 9/455* (2013.01); *G06F 9/45558* (2013.01); *G06F 21/6281* (2013.01); *H04L 63/10* (2013.01); *H04L 63/20* (2013.01); *G06F 2009/45587* (2013.01)

(58) Field of Classification Search
CPC ........ G06F 9/455; G06F 9/45558; G06F 9/50; G06F 9/5005; G06F 9/5027; G06F 9/5077; G06F 9/5061; G06F 21/62; G06F 21/6218; G06F 21/6281; H04L 63/10; H04L 63/104; H04L 63/108; H04L 63/20
See application file for complete search history.

(56) References Cited

U.S. PATENT DOCUMENTS

| | | |
|---|---|---|
| 6,622,163 B1 | 9/2003 | Tawill et al. |
| 6,801,992 B2 | 10/2004 | Gajjar et al. |
| 7,325,120 B2 | 1/2008 | Sawdon et al. |
| 7,784,049 B1 | 8/2010 | Gandler |

(Continued)

FOREIGN PATENT DOCUMENTS

| | | |
|---|---|---|
| WO | 2005081672 A2 | 9/2005 |
| WO | 2013119200 A1 | 8/2013 |
| WO | 2014/036307 A1 | 3/2014 |

OTHER PUBLICATIONS

Craig Anderson, "The first and final words on OpenStack availability zones", mirantis.com, https://www.mirantis.com/blog/the-first-and-final-word-on-openstack-availability-zones/, Jan. 28, 2017, 24 pages.

(Continued)

*Primary Examiner* — Jung W Kim
*Assistant Examiner* — Adrian Stoica
(74) *Attorney, Agent, or Firm* — Edell, Shapiro & Finnan, LLC (57) ABSTRACT

Generating and enforcing tenant-specific policies within a container includes, applying a first policy for a specific operational parameter when a software package that is running within a container and that is utilized by a plurality of tenants is leveraged by a first tenant of the plurality of tenants. A second policy is applied for the specific operational parameter when the software package is leveraged by a second tenant of the plurality of tenants.

19 Claims, 8 Drawing Sheets

(56) References Cited

U.S. PATENT DOCUMENTS

| | | | |
|---|---|---|---|
| 7,934,056 B2 | 4/2011 | Sawdon et al. | |
| 7,996,525 B2 | 8/2011 | Stienhans et al. | |
| 8,190,740 B2 | 5/2012 | Stienhans et al. | |
| 8,468,245 B2 | 6/2013 | Farber et al. | |
| 8,655,997 B2 | 2/2014 | Eilam et al. | |
| 8,762,480 B2 | 6/2014 | Park et al. | |
| 8,799,322 B2 | 8/2014 | deMilo et al. | |
| 8,850,528 B2 | 9/2014 | Van Biljon et al. | |
| 8,862,542 B2 | 10/2014 | Darcy | |
| 8,918,439 B2 | 12/2014 | Alatorre et al. | |
| 8,918,488 B2 | 12/2014 | Umbehocker et al. | |
| 9,063,763 B2 | 6/2015 | Astete et al. | |
| 9,141,785 B2 | 9/2015 | Mukkara et al. | |
| 9,264,360 B2 | 2/2016 | Bansal et al. | |
| 9,391,972 B2 | 7/2016 | Jain | |
| 9,473,419 B2 | 10/2016 | Brand | |
| 10,104,185 B1* | 10/2018 | Sharifi Mehr | H04L 67/16 |
| 2010/0235832 A1 | 9/2010 | Rajagopal et al. | |
| 2011/0055378 A1 | 3/2011 | Ferris et al. | |
| 2011/0145392 A1 | 6/2011 | Dawson et al. | |
| 2011/0145818 A1 | 6/2011 | Vemuri et al. | |
| 2011/0185147 A1 | 7/2011 | Hatfield et al. | |
| 2012/0254567 A1 | 10/2012 | Umbehocker | |
| 2013/0297905 A1 | 11/2013 | Yang et al. | |
| 2013/0332927 A1* | 12/2013 | Tang | G06F 9/45545 718/1 |
| 2014/0025723 A1 | 1/2014 | Xu et al. | |
| 2014/0068056 A1 | 3/2014 | Simitsis et al. | |
| 2014/0244585 A1 | 8/2014 | Sivasubramanian et al. | |
| 2014/0351606 A1 | 11/2014 | DeMilo et al. | |
| 2015/0032954 A1 | 1/2015 | Maheshwari et al. | |
| 2015/0052518 A1 | 2/2015 | Sarisky et al. | |
| 2016/0150003 A1 | 5/2016 | Magdon-Ismail et al. | |
| 2016/0334998 A1 | 11/2016 | George et al. | |
| 2016/0366223 A1 | 12/2016 | Mason | |
| 2017/0185437 A1* | 6/2017 | Thomas | G06F 9/45558 |
| 2018/0267830 A1* | 9/2018 | Rivera | G06F 9/4856 |
| 2018/0295036 A1* | 10/2018 | Krishnamurthy | H04L 63/20 |

OTHER PUBLICATIONS

S. Jeuk, et al., "Tenant-ID: Tagging Tenant Assets in Cloud Environments", 2013 13th IEEE/ACM International Symposium on Cluster, Cloud, and Grid Computing, May 13-16, 2013, Delft, Netherlands, 6 pages.

S. Jeuk, et al., "Towards Cloud, Service and Tenant Classification for Cloud Computing", 2014 14th IEEE/ACM International Symposium on Cluster, Cloud and Grid Computing, May 26-29, 2014, Chicago, IL, 10 pages.

S. Jeuk, et al., "Universal Cloud Classification (UCC) and its Evaluation in a Data Center Environment", 2014 IEEE 6th International Conference on Cloud Computing Technology and Science, Dec. 15-18, 2014, Singapore, 6 pages.

S. Jeuk, et al., "A Novel Approach to Classify Cloud Entities: Universal Cloud Classification (UCC)", 2015 15th IEEE/ACM International Symposium on Cluster, Cloud and Grid Computing, May 4-7, 2015, Shenzhen, China, 4 pages.

S. Jeuk, et al., "Network Segmantation in the Cloud a Novel Architecture Based on UCC and IID", 2015 IEEE 4th International Conference on Cloud Networking (CloudNet), Oct. 5-7, 2015, Niagara Falls, ON, Canada, 6 pages.

S. Jeuk, et al., "Towards Cloud-Aware Policy Enforcement with Universal Cloud Classification as a Service (UCCaaS) in Software Defined Networks", 2016 IEEE 9th International Conference on Cloud Computing, Jun. 27-Jul. 2, 2016, San Francisco, CA, 8 pages.

Atlantis, "Atlantis USX™," Technology Overview, retrieved from http://www.atlantiscomputing.com/technology/overview, on Jun. 12, 2015, 2 pages.

Sun Microsystems, Inc., "Chapter 5, Configuring Basic Storage," Sun StorageTek Common Array Manager Software, Installation Guide, retrieved from https://docs.oracle.com/cd/E19259-01/820-5747-10/chapter5.html, on Jun. 12, 2015, 10 pages.

* cited by examiner

TENANT-SPECIFIC POLICY GENERATION AND ENFORCEMENT WITHIN CONTAINERS

TECHNICAL FIELD

The present disclosure relates to cloud computing services.

BACKGROUND

In public and private cloud computing environments, applications and services are now being packaged in containers and/or virtual machines. Generally, containers are an abstraction at the application layer while virtual machines are an abstraction of physical hardware. In this regard, containers are organized on (i.e., reside on) a software container platform while virtual machines are organized on (i.e., reside on) a hypervisor. Both containers and virtual machines can isolate services or applications so that any processes or resources of a particular service or application are isolated from processes and resources of other services or applications that are all operating on a particular physical machine (i.e., a computing apparatus).

Since containers provide an abstraction at the application layer, containers provide a more lightweight solution as compared to virtual machines. Moreover, packaging an application or service (i.e., a software package) within a container may allow any number of tenants to access the software package. Consequently, containers may be preferable to virtual machines in at least some situations.

DESCRIPTION OF EXAMPLE EMBODIMENTS

Overview

Techniques are provided herein for generating and enforcing tenant-specific policies within or for a container. These techniques may be embodied as a method, an apparatus, a system, or instructions in a computer-readable storage media to perform the method.

According to at least one example embodiment, generating and enforcing tenant-specific policies within a container includes, applying a first policy for a specific operational parameter when a software package that is running within a container and that is utilized by a plurality of tenants is leveraged by a first tenant of the plurality of tenants. A second policy is applied for the specific operational parameter when the software package is leveraged by a second tenant of the plurality of tenants.

Example Embodiments

Presented herein are techniques for generating and enforcing tenant-specific policies within a container. More specifically, the techniques presented herein provide tenant-specific control groups ("cgroups") that allow operational policies for a software package (i.e., a service, microservice or application) running within a container to be defined on a per-tenant basis. Typically, every container running on a computer system is associated with a cgroup defined on that computer system, and, collectively, cgroups control resource usage for all of containers at the container level (i.e., one storage policy, one network policy, one compute policy, etc. is applied to each container). Providing tenant-specific cgroups allows each of these operational policies to be reconstituted as a set of tenant-specific operational policies so that a container servicing multiple tenants can operate in accordance with operational policies that are customized on a per-tenant basis. For example, a storage policy that is typically applied to a container by its associated cgroup can be subdivided into, modified to include, or be entirely replaced with a set of tenant-specific storage policies. Then, the container can enforce different policies when different tenants leverage the service residing therein. Thus, the techniques presented herein essentially create containers with multitenant awareness.

Moreover, when container-level cgroups are implemented as tenant-specific cgroups in accordance with the instant embodiments, tenant-specific operational policies (also referred to herein as "policies," for simplicity) can be easily and quickly shifted or changed for any tenant without any concerns that a change in policy might adversely affect other tenants utilizing the software package running within that container. Thus, over time, a tenant-specific policy (or sub-policy) can be dynamically updated and/or updated on-demand to accommodate the changing needs of a tenant and/or various external parameters (i.e., time of day, surges in demand, allocations of underlying resources, etc.). To effectuate this, the containers with multitenant awareness may also have awareness of cloud specific concepts. More specifically, at least a centrally located controller may have awareness of services running in containers, tenant-specific policies being applied to those containers, and cloud resources supporting the container. Thus, the controller may, in essence, provide the containers with awareness of cloud resources and concepts.

As is explained in further detail below, in at least some embodiments, the techniques presented herein may be facilitated by including tenant and service identification parameters to a cgroup schema to create "tenant-specific cgroups." Then, a central controller can push data structures to the tenant-specific cgroups and the tenant-specific cgroups can "consume" the data structures to implement tenant-specific policies. The controller can manage operational policies (also referred to herein simply as policies), such as storage policies, network policies, and compute policies, on a per-service/application/microservice and a per-tenant basis. Moreover, the controller, by way of being a central controller, can communicate with various resources supporting a container (i.e., compute, network, and storage resources) to ensure that the tenant-specific policies can be or are being enforced. The controller can further update any tenant-specific policies based on utilization, external factors (i.e., time of day or peak demand) and/or user input.

Figure 1:
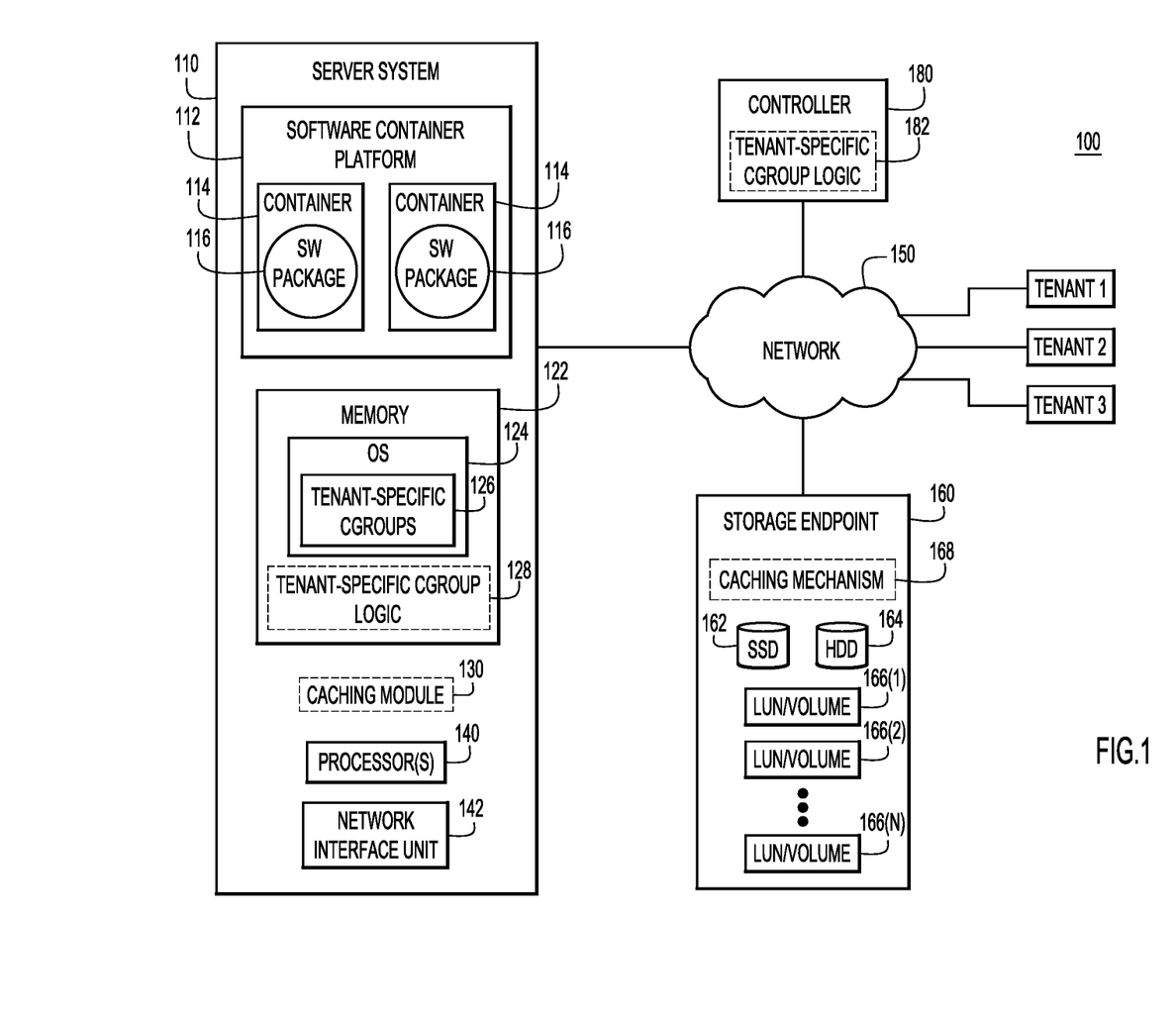
FIG. 1 is a block diagram of a cloud computing environment in which tenant-specific policies may be generated and enforced, according to an example embodiment.

Reference is first made to FIG. 1. FIG. 1 illustrates a cloud computing environment 100 according to an example embodiment. Generally, the cloud computing environment 100 may be a public cloud, a private cloud or any other type of cloud deployment. When the environment 100 is a public cloud deployment, the techniques presented herein may leverage the cloud policies to enhance the experience and offerings provided to tenants. By comparison, when the environment is a private cloud deployment, the techniques presented herein may assure that internal tenants (i.e., tenants internal to the private cloud) are provided with optimal performance that is customized to their needs (i.e., an engineer working on storage related development tasks may be afforded enhanced storage as compared to a human resource manager).

In FIG. 1, the environment 100 includes a server system 110, a storage endpoint 160, and a controller 180. The server system 110 includes a software container platform 112 that hosts one or more containers 114. Each container 114 includes a software package 116, such as a service, application, or collection of microservices. For simplicity, the software packages are each labeled as software package 116; however, the different containers 114 may each include different software packages 116, as is common in container deployments. Also, and again for simplicity, FIG. 1 illustrates a software container platform 112 with two containers 114; however, any number of containers 114 may be hosted on the software container platform 114. Additionally or alternatively, containers 114 may be hosted on a software container platform 112 included in a virtual machine (i.e., server system 110 may include a hypervisor on which one or more virtual machines may run and at least some of the virtual machines may include a software container platform 112 hosting one or more containers 114). In FIG. 1, Tenant 1, Tenant 2, and Tenant 3 can access the server system 110 via network 150 and Tenant 1, Tenant 2, and Tenant 3 are each authorized to use the software packages 116 residing within each container 114. However, as is explained in further detail below (i.e., in connection with FIG. 2), any number of tenants (i.e., end users or administrators) may access any software packages 116 residing within any group or set of containers 114.

The server system 110 may also include a memory 122 within which tenant-specific cgroup logic 128 and an operating system (OS) 124 with tenant-specific cgroups 126 may be stored. The tenant-specific cgroups 126 may limit, account for, or otherwise control resource usage (i.e., memory usage, central processing unit (CPU) usage, disk input/output (I/O) usage, network usage, etc.) for the containers 114. And, the tenant-specific cgroups 126 accommodate tenant-specific policies. That is, the tenant-specific cgroups 126 may control container resource usage on a per-tenant basis. In some instances, the tenant-specific cgroup logic 128 may include executable instructions configured to provide the tenant-specific cgroups 126. That is, tenant-specific cgroup logic 128 may include executable instructions configured to instantiate the tenant-specific cgroups 126. Instantiating may be automatic or manual, e.g., by an administrator. Regardless of how the tenant-specific cgroups 126 are created, the tenant-specific cgroups 126 include, in an embodiment, tenant identifiers and service identifiers that allow the tenant-specific cgroups 126 to apply policies on a per-tenant basis.

In at least some embodiments, the tenant-specific cgroup logic 128 causes the tenant-specific cgroups 126 to generate a set of per-tenant policies based on input received from the controller 180. For example, the tenant-specific cgroup logic 128 may cause the tenant-specific cgroups 126 to generate a set of per-tenant storage policies that cause a software package 116 running in a container 114 to utilize first memory resources for a first tenant and second memory resources for second and third tenants. Tenant-specific policies can be applied to any number of tenants using a particular service running within a container (as is explained in further detail below in connection with FIG. 2) and the tenant-specific policies can also be applied across any number of containers (as is explained in further detail below in connection with FIG. 3).

Moreover, the tenant-specific cgroup logic 128 may comprise executable instructions configured to measure and/or determine operational attributes of workloads running in the containers 114 (e.g., I/O streams originated by the software packages 116). For example, the tenant-specific cgroup logic 128 may monitor the I/O streams originating from software packages 116 to determine the I/O per second (IOPS), a read-write ratio, I/O size, the ratio of sequential-to-random I/Os, and/or the most frequently accessed storage blocks. This monitoring may allow the tenant-specific cgroup logic 128 to optimize the resource control provided by the tenant-specific cgroups 126 over time, as is discussed in further detail below in connection with FIG. 5.

Still referring to FIG. 1, in cloud environment 100, the server system 110 is supported by a storage endpoint 160. Although the storage endpoint 160 is depicted as a single element of the cloud environment 100, the storage endpoint 160 need not be located in a single location and may be distributed geographically. The storage endpoint 160 is also just one example of storage that may be mounted to the server system 110 to support a software package 116 running within a container 114 on the server system 110. That is, the storage endpoint is one example of a storage resource. In other embodiments, a software package 116 running within a container 114 on the server system 110 may utilize any storage resource, including storage resources local to the server system 110.

That being said, in FIG. 1, storage endpoint 160 includes a persistent storage medium (hard disk drive (HDD) or solid state disk (SSD)) and a high speed, low latency non-volatile (random access memory) caching mechanism. For simplicity, FIG. 1 shows storage endpoint 160 includes SSD storage 162, a plurality of Logical Unit Numbers (LUNs)/Volumes 166(1)-166(N), and a HDD 164. The storage endpoint 160 is capable of guaranteeing a minimum number of IOPS on a Volume/LUN basis. The storage endpoint 160 may also be able to optimize for sequential and random I/O workloads by fetching blocks ahead of the currently accessed ones from sequential workloads. In some embodiments, the storage endpoint 160 may also include a caching mechanism 168, either in addition to or as alternative to a caching module 130 included in the server system 110. Thus, the storage endpoint 160 may be manipulated by the caching module 130 of the server system 110 and/or by the caching mechanism 168 (i.e., to configure to the storage endpoint 160 as needed to support a software package operating in accordance with a particular tenant-specific operational policy).

Still referring to FIG. 1, the server system 110 may also include a network interface unit 142 configured to enable communications with the storage endpoint 160, the controller 180, and or Tenants 1-3 via network 150. For example, a software package 116 may generate an I/O (read/write command), which is transported over the network 150 to the storage endpoint 160. When the storage endpoint 160 receives the I/O from the network 150, the storage endpoint 160 executes the operation (reads data, or writes data) to/from its internal structures. If possible, the storage endpoint 160 will service the operation to cache (for writes) or if the data is already in cache, from cache (for reads). If the data is not in cache (a "cache miss") then the storage infrastructure will read data from the long term storage.

Meanwhile, the controller 180 may be a software defined network (SDN) controller or any other type of orchestrator and may push policies from tenants to the server system 110. Additionally or alternatively, the controller 180 may communicate with the storage endpoint 160 (as well as any other resources utilized by a software package 116 running within a container 114) to ensure that parameters/requirements of tenant-specific policies can be or are being satisfied. For example, in some instances, a tenant-specific storage policy may have specific requirements/parameters that the container can only enforce by relying on other resources (i.e., resources in environment 100, but outside of server system 110). Consequently, the controller 180 may communicate these requirements to the appropriate resources to ensure the tenant-specific policies can be or are being enforced.

As a more specific example, in order to ensure a container can provide a certain I/O rate for storage read/write access, the controller 180 may communicate these requirements to network resources and storage resources (such as storage endpoint 160). To effectuate this, the controller may also (i.e., in addition to the server system 110) include tenant-specific cgroup logic 182 that enables the controller 180 to interact with the server system 110, remain informed of tenant-specific storage policies and leverage relationships with various resources to ensure the tenant-specific policies can and are being satisfied. Components and/or elements of the controller 180 are described in further detail below in connection with FIG. 7 and the operations of the controller 180 are described in further detail below in connection with the remaining Figures.

Figure 2:
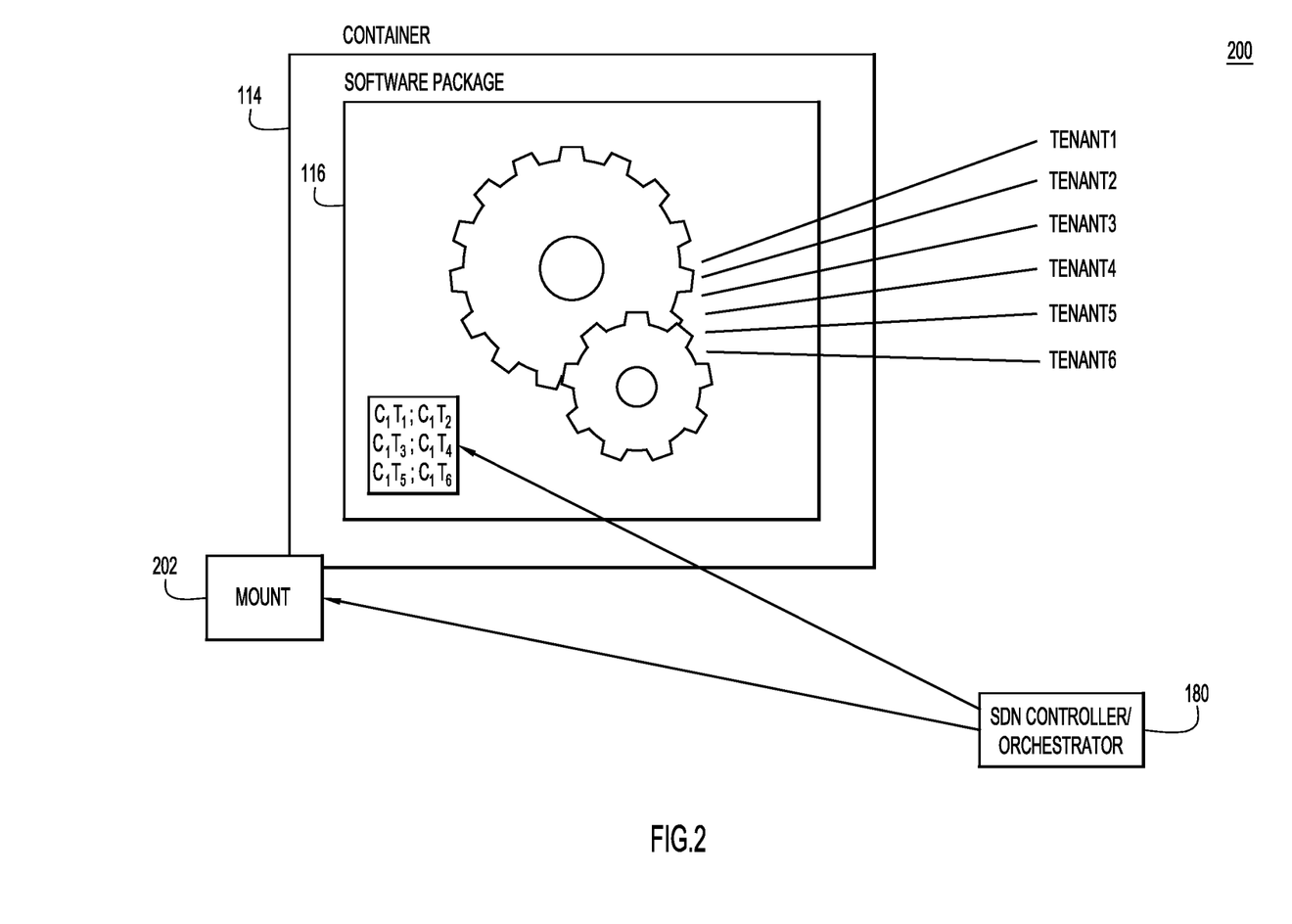
FIG. 2 is a block diagram of a portion of the cloud computing environment of FIG. 1, with the container illustrated independently of its host computing system.

FIG. 2 is a block diagram depicting a portion 200 of the network environment 100 of FIG. 1. Reference is also made to FIG. 1 for purposes of the description of FIG. 2. In FIG. 2, the controller 180 is shown pushing data structures to the server system 110. The tenant-specific cgroups 126 consume the data structures in order to create tenant-specific policies. Consequently, the controller 180 can effectively create tenant-specific operational policies (by causing the tenant-specific cgroups 126 to create tenant-specific operational policies) for any tenant (i.e., any of Tenants 1-6) using a software package 116 (i.e., a service, application, or microservice) running in a container 114 that resides on the server system 110.

A particular tenant-specific policy for a particular container 114 may apply to a single tenant or many tenants that use the service, application, or microservice running in that container 114. However, in FIG. 2, each tenant with access to the software package 116 has its own tenant-specific policy. That is, in the example environment of FIG. 2, Tenants 1-6 each have access to software package 116 (i.e., a service, application, or microservice) and each of Tenants 1-6 has its own tenant-specific policy. The tenant-specific policies are represented by as a set of Container-Tenant identifiers: $C_1T_1$; $C_1T_2$; $C_1T_3$; $C_1T_4$; $C_1T_5$; $C_1T_6$, with $C_x$ representing the container and $T_x$ representing a specific Tenant (although these tenant-specific policies are shown within the software package 116, the tenant-specific policies do not necessarily reside within the software package 116). Each of these policies is created when the controller 180 pushes a data structure to the server system 110. The data structure defines tenant-specific operational parameters or policies for software package 116 and causes the cgroups to create policies relating to one or more operational parameters. That is, a tenant-specific policy is generated when tenant-specific cgroup logic 182 communicates the operational parameters or requirements requested or specified by a tenant to the tenant-specific cgroups 126 via the tenant-specific cgroup logic 128.

As a more specific example, when a new tenant signs up for a specific service running in a container 114, the controller 180 may push a data structure to the server system 110 to set a tenant-specific storage policy that controls how the software package 116 interacts with a storage endpoint associated with the software package 116. That is, a tenant-specific storage policy may specify how data associated with the software package service is to be stored when the software package is executing for the particular tenant. Generally, the data structure may be configured to request specific operating information or parameters in a manner that allows the cgroups to create a tenant-specific operating policy. In one particular example, the data structure may have the following format: [SERVICE-ID:TENANT-ID:{Set of Policy Information}].

In this example, the service-ID may identify the particular service (which is running within a container) with a unique identifier (i.e., "0000002"), the tenant-ID may identify the particular tenant with another unique identifier (i.e., 12345678), and the set of policy information may define various storage aspects, such as whether the service should have read-access and/or write-access when running for the particular tenant, and an I/O rate for the service when running for the particular tenant. Thus, when a particular tenant wants a particular service to operate with read access, write access, and a low I/O-Rate, the tenant may specify these parameters to the controller and the controller may send the following data structure to the server system: [0000002: 12345678:{Read-Access: YES|Write-Access: YES|I/O-Rate: Low| ... }]. The tenant-specific cgroup logic 128 may then add a policy to the tenant-specific cgroups 126 and, since the tenant-specific cgroups 126 can process tenant and service identifiers, the tenant-specific cgroups 126 can generate and enforce a tenant-specific policy at any containers within which the identified service is running. That is, the tenant-specific cgroups 126 may then apply the tenant-specific policy when the identified tenant is leveraging the identified service.

Still referring to FIG. 2, as (or before) the tenant-specific cgroups 126 consume a data structure to generate a new tenant-specific policy, the tenant-specific storage policies may be passed to the storage endpoint 160 (i.e., via a mount 202) and/or any other resources of the cloud environment. Advantageously, since the data structure is pushed to the server system by the controller 180, the controller 180 may have awareness of the tenant-specific policy. Consequently, the controller 180, which has pre-established relationships with various resources in the cloud environment, can inform the various resources of the policy to ensure that parameters of the tenant-specific policy are satisfied by the various resources.

In the previous example, the tenant-specific operating policy is a tenant-specific storage policy. In other examples, the tenant-specific operating policy need not be a storage policy and, instead, may be a compute policy, network policy, or any other type of operational policy. Nevertheless, when the tenant-specific policy is a storage policy, the tenant-specific policy may define or control the way a service accesses a storage endpoint when the service is running (i.e., executing) for a particular tenant. The tenant-specific storage policy may control this access with any degree of specificity or granularity, such that in some instances a per-tenant storage policy may allow or deny access to storage on a per-tenant basis while, in other instances, the per-tenant policies may provide fine-grained policies that define I/O limits on a per-tenant basis, specify a particular storage endpoint(s) for use on a per-tenant basis, and/or define other characteristics relevant for object or block storage on a per-tenant basis.

As further examples, tenant-specific storage policies can be applied to objects (for object based storage endpoints) and can include information like the number of replicas, the performance of the drives, the geographical location and efficient data placement (i.e., based on projected ring size). That is, in at least some instances, the techniques presented herein provide fine-grained policy enforcement on a per-service (or per-microservice) and per-tenant basis. Consequently, a service running within a container dealing with objects on a tenant basis, can meet the specific requirements of each tenant which may allow enforcement of service-level agreements (SLAs) at a container level.

In the specific example depicted in FIG. 2, although Tenants 1-6 are all accessing the same software package 116 in FIG. 2 (i.e., the same application), Tenants 1-6 may each have different requirements when storing data as objects and tenant-specific storage policies may ensure that these different requirements (i.e., SLA requirements) are met. For example, tenants from different geographic regions may have different requirements, with a tenant from Germany (i.e., Tenant 1) requiring data storage within German borders while another tenant (i.e., Tenant 2) has specific replication requirements (but no geographic requirements). The techniques presented herein allow a container to satisfy each of these requirements by applying policies, such as storage policies, on a per-tenant basis.

Figure 3:
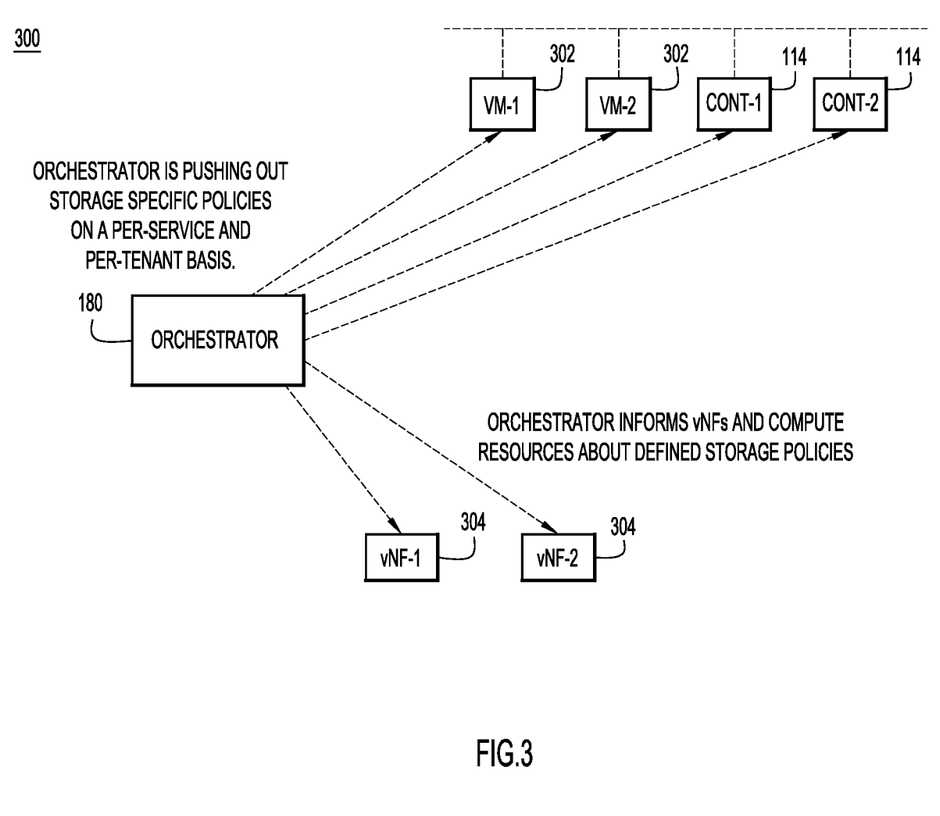
FIG. 3 is a block diagram of another cloud computing environment in which tenant-specific policies may be generated and enforced, according to an example embodiment.

FIG. 3 depicts another network environment 300. Reference is also made to FIGS. 1 and 2 for the purposes of the description of FIG. 3. As mentioned, tenant-specific policies can be applied to any number of containers. That is, a tenant may use the same tenant-specific policy for multiple containers or may use different tenant-specific policies at different containers. Consequently, although the controller/orchestrator 180 is pushing out data structures to various containers 114 and virtual machines 302 (within which containers may reside) in FIG. 3, the tenant-specific policies pushed to each container 114 (or virtual machine 302) need not be the same. Instead, the controller 180 may push different tenant-specific policies (i.e., by pushing consumable data structures) to different containers or the controller 180 may push the same tenant-specific policy to one or more container 114 within which services, applications, or microservices utilized by a particular tenant are residing. That is, using the $C_xT_x$ Container-Tenant policy notation used above, the controller may push tenant-specific policy $C_1T_5$ to a first container and $C_2T_5$ to a second container, and $C_1T_5$ and $C_2T_5$ may be the same policy or different policies.

In FIG. 3, the controller 180 is also communicating with resources associated with the containers 114 (and virtual machines 302). As mentioned, in at least some embodiments, controller 180 pushes out a tenant-specific storage policy to a container or virtual machine deployment of a specific application/service/micro-service while also assuring that the specific application/service/micro-service has access to resources required to satisfy the parameters of a tenant-specific policy. That is, the tenant-specific policies may be used as an input to other resources, like virtual network functions (vNFs) 304 and the resources (i.e., compute resources, network resources, storage resources, etc.) may react based on the policies to enable and/or assure that the policy requirements are met (i.e., vNFs can be optimized so that the storage policy is met from a network perspective through, for example, assuring low latency, high bandwidth paths). This may assure that an application/service/micro-service running in accordance with a tenant-specific storage is associated with the necessary storage, network, and compute resources to satisfy the parameters of the tenant-specific policy, as is discussed in further detail below in connection with FIG. 5.

Figure 4:
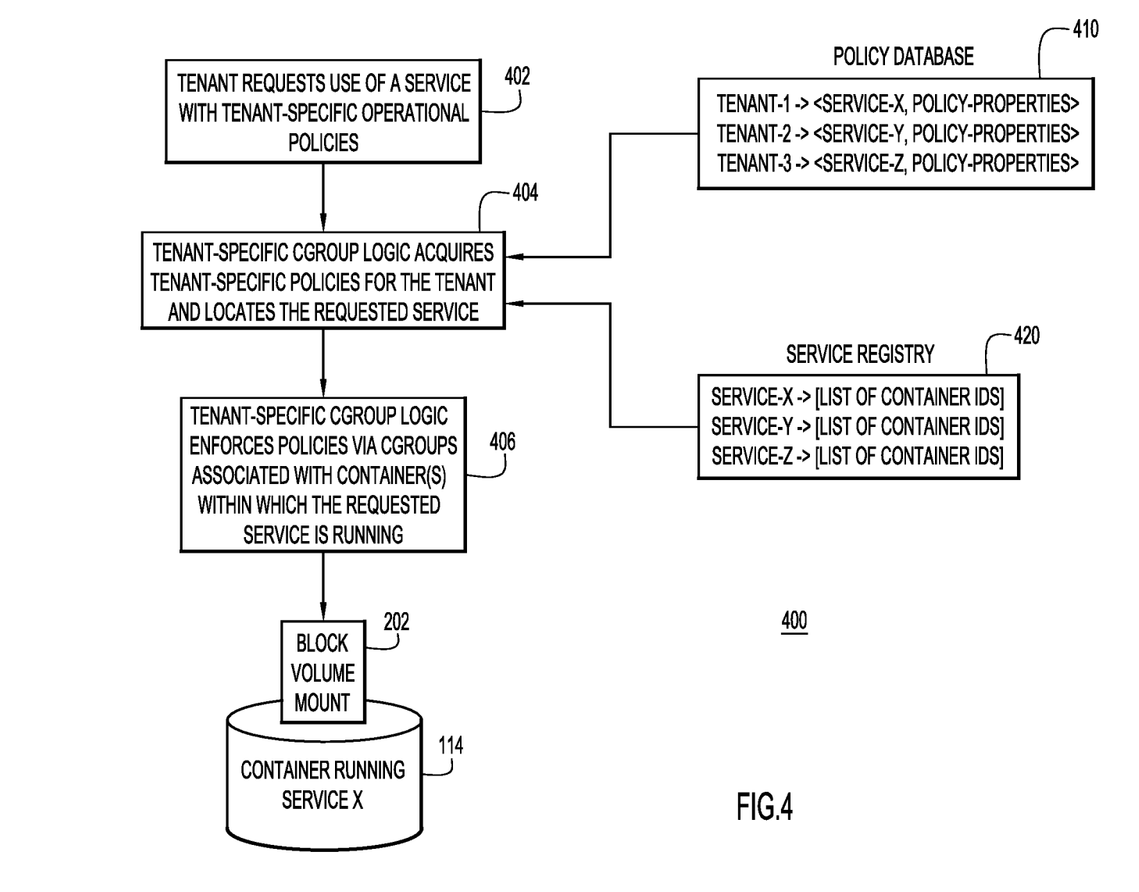
FIG. 4 is a flowchart illustrating a process for enforcing tenant-specific policies within a container, according to an example embodiment.

FIG. 4 depicts a flow chart of a method 400 for enforcing tenant-specific operational policies. Reference is also made to FIGS. 1-3 for the purposes of the description of FIG. 4. Initially, at 402, a tenant requests use of a service running in a container for which the tenant has previously requested tenant-specific operational policies. At 404, the tenant-specific cgroup logic acquires the tenant-specific policies for the requesting tenant by accessing a policy database 410 that is storing the tenant-specific cgroup policies (although not shown in FIG. 1, the policy database 410 may be local or remote to the server system 110). Additionally, at 404, the tenant-specific cgroup logic locates the requested service by identifying the containers hosting the service via a service registry 420 (although not shown in FIG. 1, the service registry 420 may also be local or remote to the server system 110). Once the tenant-specific cgroup logic has obtained the tenant-specific policies from the policy database 410 and the service information from the service registry 420, the tenant-specific cgroup logic can alert the tenant-specific cgroups associated with the appropriate containers to create and/or enforce a tenant-specific policy at 406.

For example, in a scenario where Tenant 1 requests use of Service X (i.e., Tenant 1 leverages Service X), the tenant-specific cgroup logic may, at 404, access the policy database 410 and the service registry 420 to determine that Tenant 1 is associated with a specific policy for Service X and that Service X is running with container 1, container 2, and container 3, respectively. Then, at 406, the tenant-specific cgroup logic can enforce policies via tenant-specific cgroups associated with container 1, container 2, and container 3 to enforce or apply Tenant 1's tenant-specific policy while running Service X for Tenant 1. In FIG. 4, the enforcement is illustrated by the interaction between 406 and the container 114 running Service X. Additionally, in FIG. 4, the enforcement operation of 406 is shown interacting with block volume mount 202 because, as mentioned above in connection with FIGS. 2 and 3, in at least some instances, the tenant-specific cgroup logic may interact with resources that may be used to enforce a tenant-specific policy.

Figure 5:
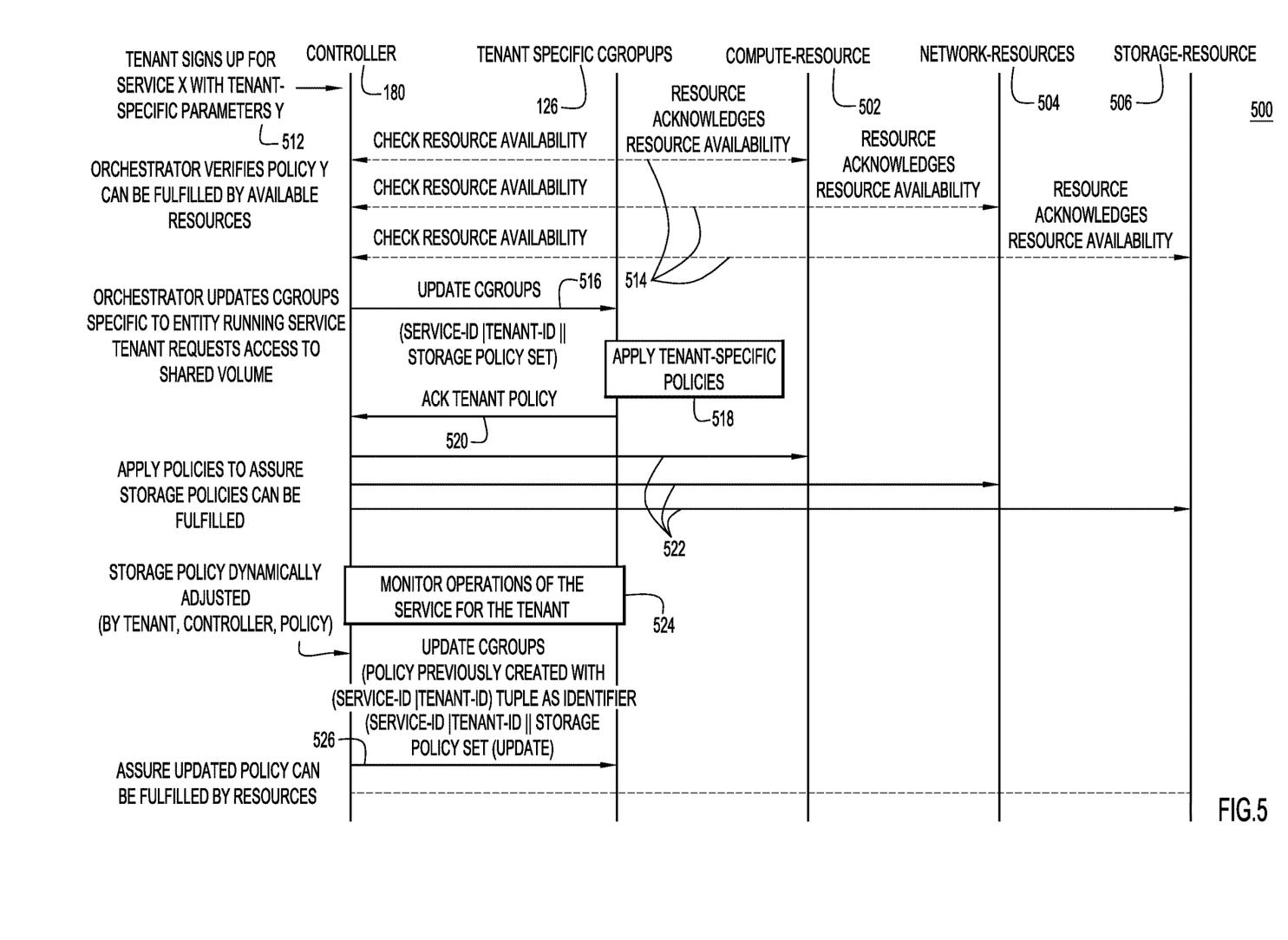
FIG. 5 is a sequence diagram illustrating operations for generating and enforcing tenant-specific policies within a container, according to an example embodiment.

FIG. 5 is a sequence diagram depicting operations 500 for creating, enforcing, and updating tenant-specific policies. Reference is also made to FIGS. 1-4 for the purposes of the description of FIG. 5. Initially, at 502, a tenant signs up for service X with a tenant-specific parameters Y (which may, in some instances, be represented as a policy). Typically, this request/sign up is initiated through the controller or orchestrator 180; however, in some instances, a tenant may sign up or submit a request directly to a computing system (i.e., server system 110) hosting at least a portion of the service at issue (i.e., a computing system hosting at least some of the containers within which the service, or a portion thereof, is running).

Regardless of how the request is received at 512, the controller 180 eventually learns of the request and, in response, the controller 180 checks resource availability and updates the cgroups, at 514 and 516, respectively. More specifically, at 514, the controller 180 checks the resource availability of at least one of compute resources 502, network resources 504, and storage resources 506. In some instances, the controller 180 only checks the necessary resources. That is, the controller may identify cloud infrastructure resources supporting a container running the service at issue and analyze the cloud infrastructure resources to determine that the specific operating parameters of the request can be satisfied. For example, when the tenant-specific policy is a storage policy (like storage policy Y), the controller 180 may check the availability of storage resources 506 and network resources 504 to ensure that in the event a storage endpoint supporting the container in question can satisfy the parameters of a policy, the network resources will not create an issue.

The cgroup updates performed at 516 may involve the processes described above (i.e., in connection with FIGS. 2 and 4). For example, the cgroup update may involve communicating data structures to the tenant-specific cgroups 126 and/or identifying tenant-specific cgroups 126 associated with a tenant and service that are subjects of the request. Assuming that the necessary resources are available, the tenant-specific cgroups 126 apply tenant-specific policies at 518 at the appropriate containers based on the parameters requested by the tenant. That being said, in different embodiments, the resource availability check(s) performed at 514 may be performed before or concurrently with the operations performed at 516 and 518. The cgroups 126 may (i.e., via the tenant-specific cgroup logic) acknowledge the request at 520. In response, at 522, the controller 180, may ensure that the necessary resources remain available to enforce the tenant-specific policies. That is, the controller 180 may reserve any resources required for a tenant-specific policy.

Over time, the tenant-specific cgroup logic (at the server system 110 and/or the controller 180) may monitor enforcement of the tenant-specific operational policies (i.e., Storage Policy Y) at 524. In some instances, this may entail monitoring a workload of the service, application, or microservice operating in accordance with the tenant-specific policy (i.e., by monitoring I/Os generated by the service, application, or microservice, as was described above in connection with FIG. 1). Additionally or alternatively, the underlying resources can be monitored. Still further, external parameters, such as time of day, overall usage of cloud resources, etc. can be monitored (i.e., by monitoring metadata). Based on this monitoring, the controller 180 (and/or the tenant-specific cgroup logic 128) may dynamically adjust or update the tenant-specific storage policies (via the tenant-specific cgroups), at 526, to optimize the tenant-specific policies based on the monitoring. For example, if a tenant pays a premium for peak hour performance, the dynamic tenant-specific cgroup might dynamically modify storage policy Y to cope with a peak-hour load. Then, during off-peak hours, storage policy Y can be dynamically set to best-effort to save resources (and money) for the tenant. Additionally or alternatively, if the monitoring reveals that a reserved resource is not being used or is only being partially used, the dynamic adjustment may adjust a tenant-specific policy accordingly (i.e., to lessen the load on associated resources).

The controller 180 (and/or the tenant-specific cgroup logic 128) may also update the tenant-specific storage policies (via the tenant-specific cgroups), at 526 to accommodate a change in the tenant's requested parameters on-demand. For example, a tenant may update their tenant-specific policy via the same data structure discussed above in connection with FIG. 2. That is, in an example discussed above, the controller sent the following data structure to the tenant-specific cgroup logic 128 to create a new tenant-specific policy: [0000002:12345678:{Read-Access: YES|Write-Access: YES|I/O-Rate: Low| . . . }]. To update this tenant-specific policy to include a high I/O-rate (as opposed to a low I/O-rate), the controller may send the following data structure: [0000002:12345678:{Read-Access: YES|Write-Access: YES|I/O-Rate: HIGH| . . . }]. In some instances, a tenant may need to pay to upgrade their policies (i.e., a tenant must provide consideration for an improved SLA).

Figure 6A:
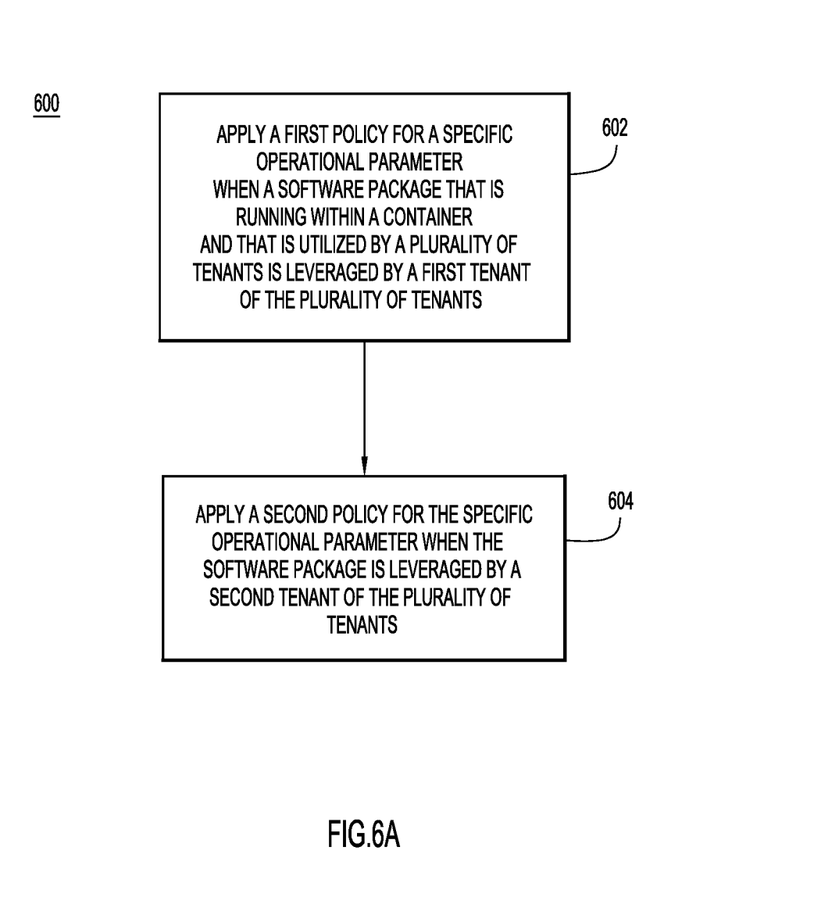
FIG. 6A is a high-level flowchart illustrating a process for generating and enforcing tenant-specific policies for a container from the perspective a computing system hosting the container, according to an example embodiment.

FIG. 6A depicts a high-level method 600 for generating and enforcing tenant-specific policies within a container. The method 600 is from the perspective of a computing apparatus hosting the container within which a software package utilized by a plurality of tenants operates in accordance with operating policies specified by a control group (or at least a portion of the computing apparatus).

At 602, the computing apparatus applies a first policy for a specific operational parameter when a software package that is running within a container and that is utilized by a plurality of tenants is leveraged by a first tenant of the plurality tenant. At 604, the computing apparatus applies a second policy for the specific operational parameter when the software package is leveraged by a second tenant of the plurality of tenants. For example, different storage policies may be applied to a specific storage parameter (i.e., I/O Rate) when the different tenants are leveraging the software package that is running within the container. As is described repeatedly herein, the first policy and the second policy may be defined by a tenant-specific control group that controls resource usage of the container on a per-tenant basis. Consequently, the first policy and second policy may have been initially created in response to requests from the first and second tenants (as described, for example, in connection with FIG. 5). Moreover, a third policy can be added to the tenant-specific control group in response to a request from a third tenant (i.e., in the same manner that the first and second policy were created) so that the third policy is applied when the software package is leveraged by the third tenant.

Moreover, regardless of how the policies were created, the policies may be applied or enforced via any of the techniques described herein (i.e., via the techniques described in connection with FIG. 4). However, and as is also described herein, in some instances, the tenant-specific cgroup logic may determine that infrastructure resources (i.e., computer resources, network resources, and storage resources) supporting the container can satisfy operating parameters necessitated by the third policy before a policy is added/created to the tenant-specific cgroups and applied to the container. Additionally or alternatively, the tenant-specific cgroup logic may monitor at least one of enforcement of the first policy, external factors, a workload of the software package, or user input and dynamically adjust at least one of the first policy or the second policy based on the monitoring.

Figure 6B:
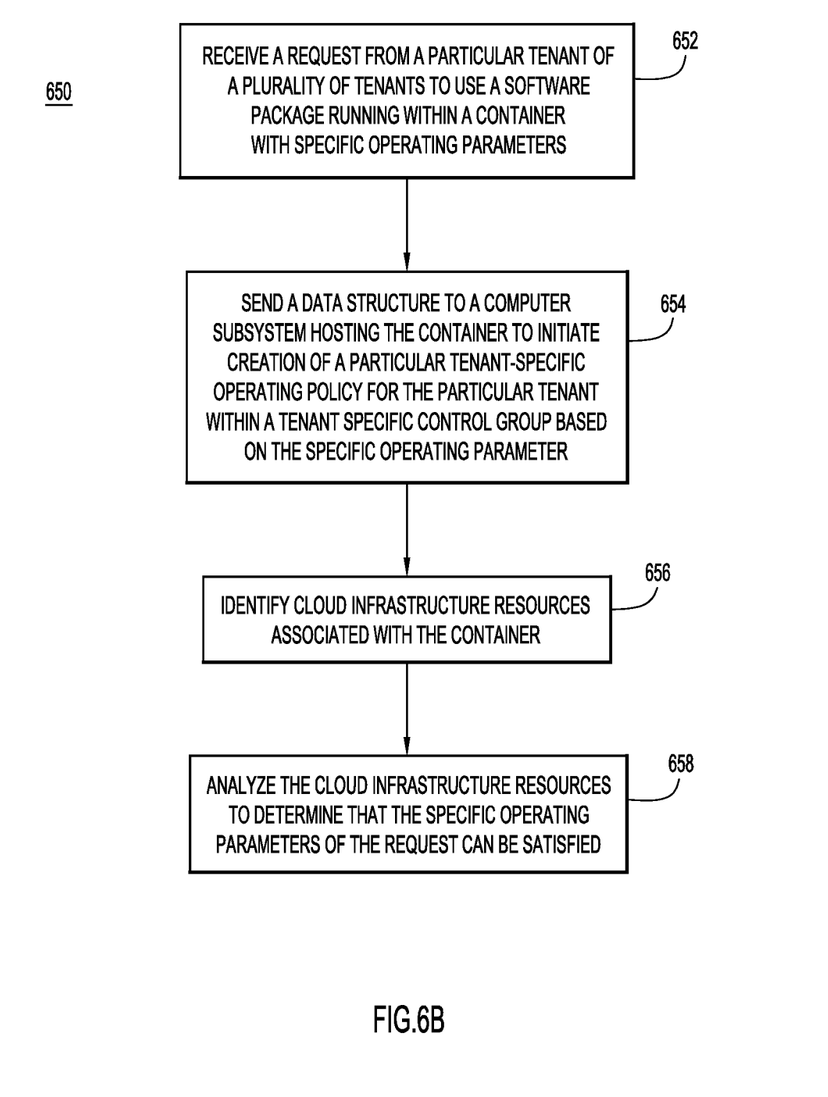
FIG. 6B is a high-level flowchart illustrating a process for generating and enforcing tenant-specific policies for a container from the perspective of a central controller in communication with a computing system hosting the container, according to an example embodiment.

FIG. 6B depicts a high-level method 650 for generating and enforcing tenant-specific policies within a container. Method 650 is from the perspective of a centralized controller that is in communication with a server system hosting a container, within which a software package utilized by a plurality of tenants operates in accordance with operating policies specified by a control group.

At 652, the controller receives a request from a particular tenant of a plurality of tenants to use a software package running within a container with specific operating parameters. At 654, the controller communicates with a computer subsystem (e.g., sends a data structure defining desired per-tenant policies to the computer subsystem) hosting the container to initiate creation of a particular tenant-specific operating policy for the particular tenant within a tenant-specific control group based on the specific operating parameter. At 656 and 658, the controller identifies cloud infrastructure resources associated with the container and analyzes the cloud infrastructure resources to determine that the specific operating parameters of the request can be satisfied, respectively. As is discussed above (i.e., in connection with FIG. 5), identifying and analyzing cloud infrastructure may ensure that tenant-specific policies can and are being supported.

Figure 7:
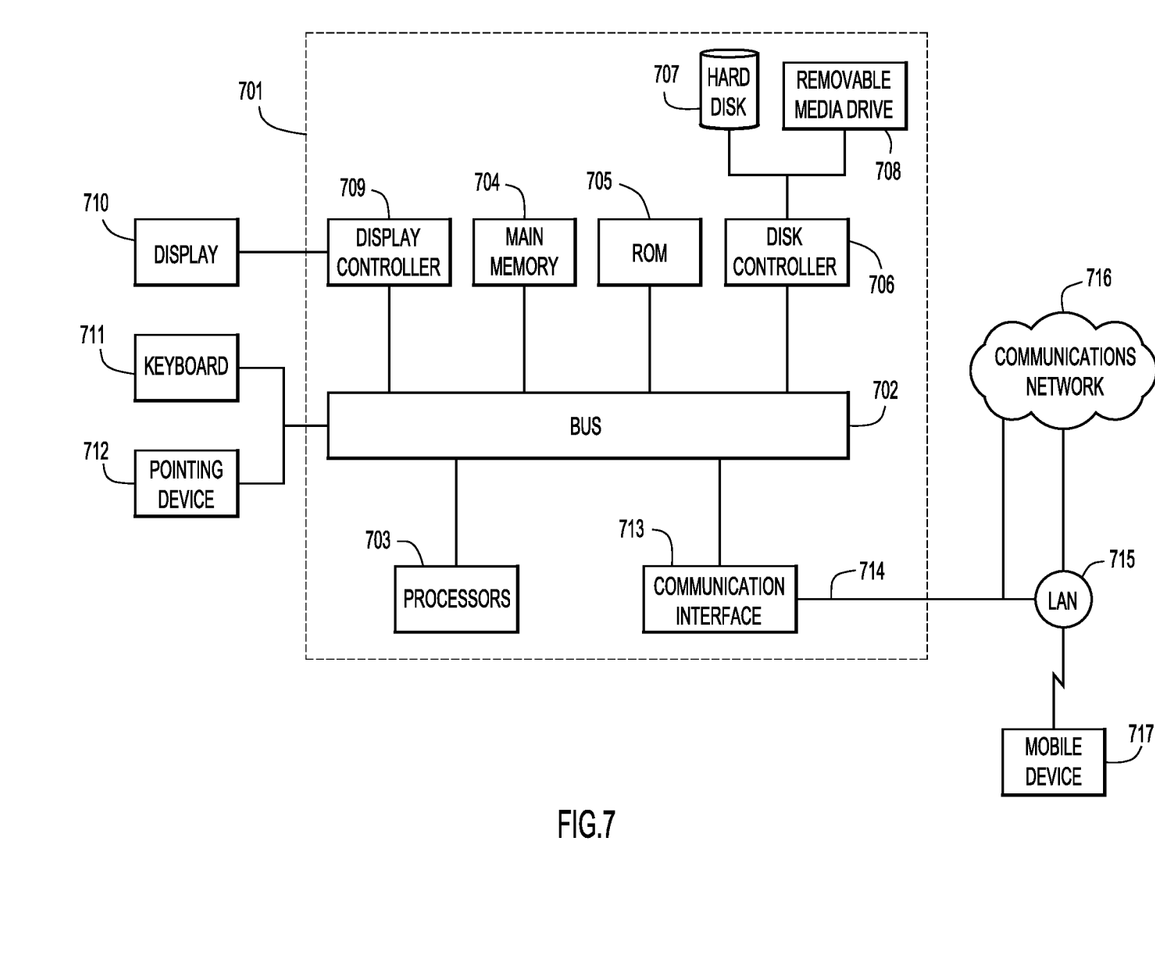
FIG. 7 is a block diagram that illustrates a computer system or apparatus in which the techniques presented herein may be implemented.

FIG. 7 depicts a block diagram of an apparatus that may configured to perform the techniques presented herein. The apparatus may be implemented on a computer system 701 and may be representative of the controller 180 or the server system 110 of FIG. 1. The computer system 701 may be programmed to implement a computer based device. The computer system 701 includes a bus 702 or other communication mechanism for communicating information, and a processor 703 coupled with the bus 702 for processing the information. While the figure shows a single block 703 for a processor, it should be understood that the processor 703 represents a plurality of processors or processing cores, each of which can perform separate processing. The computer system 701 may also include a main memory 704, such as a random access memory (RAM) or other dynamic storage device (e.g., dynamic RAM (DRAM), static RAM (SRAM), and synchronous DRAM (SD RAM)), coupled to the bus 702 for storing information and instructions to be executed by processor 703. In addition, the main memory 704 may be used for storing temporary variables or other intermediate information during the execution of instructions by the processor 703. Main memory may also be used to store logic instructions or software for performing the operations shown in FIGS. 3-5.

The computer system 701 may further include a read only memory (ROM) 705 or other static storage device (e.g., programmable ROM (PROM), erasable PROM (EPROM), and electrically erasable PROM (EEPROM)) coupled to the bus 702 for storing static information and instructions for the processor 703.

The computer system 701 may also include a disk controller 706 coupled to the bus 702 to control one or more storage devices for storing information and instructions, such as a magnetic hard disk 707, and a removable media drive 708 (e.g., floppy disk drive, read-only compact disc drive, read/write compact disc drive, compact disc jukebox, tape drive, and removable magneto-optical drive). The storage devices may be added to the computer system 701 using an appropriate device interface (e.g., small computer system interface (SCSI), integrated device electronics (IDE), enhanced-IDE (E-IDE), direct memory access (DMA), or ultra-DMA).

The computer system 701 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 701 may also include a display controller 709 coupled to the bus 702 to control a display 710, such as a liquid crystal display (LCD), light emitting diode (LED) display, etc., for displaying information to a computer user. The computer system 701 may include input devices, such as a keyboard 711 and a pointing device 712, for interacting with a computer user and providing information to the processor 703. The pointing device 712, for example, may be a mouse, a trackball, or a pointing stick for communicating direction information and command selections to the processor 703 and for controlling cursor movement on the display 710. In addition, a printer may provide printed listings of data stored and/or generated by the computer system 701.

The computer system 701 performs a portion or all of the processing operations of the embodiments described herein in response to the processor 703 executing one or more sequences of one or more instructions contained in a memory, such as the main memory 704. For example, memory 704 may include tenant-specific cgroup logic 128 or 182. Such instructions may be read into the main memory 704 from another computer readable medium, such as a hard disk 707 or a removable media drive 708. One or more processors in a multi-processing arrangement may also be employed to execute the sequences of instructions contained in main memory 704. In alternative embodiments, hard-wired circuitry may be used in place of or in combination with software instructions. Thus, embodiments are not limited to any specific combination of hardware circuitry and software.

As stated above, the computer system 701 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 701, for driving a device or devices for implementing the described embodiments, and for enabling the computer system 701 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 701 also includes a communication interface 713 coupled to the bus 702. The communication interface 713 provides a two-way data communication coupling to a network link 714 that is connected to, for example, a local area network (LAN) 715, or to another communications network 716. For example, the communication interface 713 may be a wired or wireless network interface card or modem (e.g., with SIM card) configured to attach to any packet switched (wired or wireless) LAN or WWAN. As another example, the communication interface 713 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 713 sends and receives electrical, electromagnetic or optical signals that carry digital data streams representing various types of information.

The network link 714 typically provides data communication through one or more networks to other data devices. For example, the network link 714 may provide a connection to another computer through a local area network 715 (e.g., a LAN) or through equipment operated by a service provider, which provides communication services through a communications network 716. The local network 714 and the communications network 716 use, for example, electrical, electromagnetic, or optical signals that carry digital data streams, and the associated physical layer (e.g., CAT 5 cable, coaxial cable, optical fiber, etc.). The signals through the various networks and the signals on the network link 714 and through the communication interface 713, which carry the digital data to and from the computer system 701 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 701 can transmit and receive data, including program code, through the network(s) 715 and 716, the network link 714 and the communication interface 713. Moreover, the network link 714 may provide a connection to a mobile device 717 such as a personal digital assistant (PDA) laptop computer, cellular telephone, or modem and SIM card integrated with a given device.

There are several advantages to the techniques presented herein. For example, the techniques presented herein create containers with awareness. The containers are not only aware of a tenant that is currently leveraging a software package running therein, but are also aware of cloud infrastructure supporting the software package, at least because a central controller is communicating tenant-specific policies to the containers and the cloud infrastructure. Put another way, the techniques presented herein provide containers that can successfully implement tenant-specific policies. Among other advantages, the tenant-specific policies may allow enforcement of SLAs at a container level. Moreover, the tenant-specific policies can be updated dynamically or on-demand.

As one brief example, in scenarios where different tenants pay different premiums for service and parameters of the service are defined through an SLA, the techniques presented herein may allow for SLA compliance within a container. Thus, when a tenant/user paying a premium demands and expects a better (and distinguished) storage service than someone who only pays for best effort storage access, the techniques presented herein may allow this expectation to be met at a service-level, even when the service is running within a container. Put another way, the techniques presented herein allow fine-grained enforcement of tenant policies and requirements. More generally, the techniques presented herein provide an improvement that solves problems unique to container deployments.

By comparison, non-tenant-specific cgroups cannot set operational policies at a container level on a per-tenant basis and are not easily adjustable. Instead, non-tenant-specific cgroups apply operating policies that are tenant agnostic and do not have awareness of cloud-specific concepts, such as multitenancy, to containers (and virtual machines, for that matter). In response to these tenant agnostic policies, containers apply the same operating policies across all tenants, without any customization or adaptability that might satisfy tenant-specific demands or varying circumstances. Moreover, policies set by non-tenant-specific cgroups may be too coarse because cgroups do not typically have awareness of other resources in a cloud environment.

To summarize, in one form, a method is provided comprising: at a computing apparatus hosting a container, within which a software package utilized by a plurality of tenants is running, applying a first policy for a specific operational parameter when the software package is leveraged by a first tenant of the plurality of tenants; and applying a second policy for the specific operational parameter when the software package is leveraged by a second tenant of the plurality of tenants.

In another form, an apparatus is provided comprising: An apparatus comprising: a network interface unit configured to enable communications via a network; a memory configured to store logic instructions; and a processor, when executing the logic instructions, configured to apply a first policy for a specific operational parameter when a software package that is running within a container and that is utilized by a plurality of tenants is leveraged by a first tenant of the plurality of tenants; and apply a second policy for the specific operational parameter when the software package is leveraged by a second tenant of the plurality of tenants.

In yet another form, a non-transitory computer-readable storage media is provided encoded with software comprising computer executable instructions and when the software is executed operable to: apply a first policy for a specific operational parameter when a software package that is running within a container and that is utilized by a plurality of tenants is leveraged by a first tenant of the plurality of tenants; and apply a second policy for the specific operational parameter when the software package is leveraged by a second tenant of the plurality of tenants.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    at a computing apparatus having a software container platform hosting a container, within which a software package is running, the software package utilized by a plurality of tenants,
    receiving, by a tenant-specific control group from a controller, a data structure including a tuple of information about a specific operational parameter, a tenant identification of a first tenant, and a service identification of a service provided by the software package;
    defining, by the tenant-specific control group, a first policy and a second policy different from the first policy, wherein the tenant-specific control group controls resource usage of the software package on a per-tenant basis and defines the first policy based on the data structure;
    applying the first policy for the specific operational parameter when the software package is leveraged by the first tenant of the plurality of tenants; and
    applying the second policy for the specific operational parameter when the software package is leveraged by a second tenant of the plurality of tenants.

2. The method of claim 1, further comprising:
    receiving a request from a third tenant of the plurality of tenants to use the software package with a third policy; and
    adding the third policy to the tenant-specific control group so that the third policy is applied when the software package is leveraged by the third tenant.

3. The method of claim 2, further comprising:
    before adding the third policy to the tenant-specific control group, determining that infrastructure resources supporting the container can satisfy operating parameters necessitated by the third policy,
    wherein the infrastructure resources include computer resources, network resources, and storage resources.

4. The method of claim 1, wherein the first policy comprises:
    a tenant-specific storage policy that specifies how data associated with the software package is to be stored when the software package is executing for the first tenant.

5. The method of claim 1, further comprising:
    monitoring, by the tenant-specific control group, at least one of enforcement of the first policy, external factors, a workload of the software package, or user input; and
    dynamically adjusting at least one of the first policy or the second policy based on the monitoring.

6. The method of claim 1, wherein the software container platform hosts at least one additional container, and wherein each of the container and the at least one additional container provides the same service to the plurality of tenants by running the software package.

7. The method of claim 6, wherein the first policy causes the software package to utilize a first resource when providing the same service to the first tenant and the second policy causes the software package to utilize a second resource, different from the first resource, when providing the same service to the second tenant.

8. The method of claim 1, further comprising:
    applying the first policy for the specific operational parameter when a second software package is leveraged by the first tenant of the plurality of tenants,
    wherein the software container platform hosts a second container which runs the second software package utilized by the plurality of tenants.

9. The method of claim 1, wherein the first policy is a tenant-specific storage policy that is applied to object based storage endpoints and includes at least one of a number of replicas, performance of drives, geographic location, and efficient data placement.

10. The method of claim 1, wherein the software package is an application that is running in the container and is accessed by the plurality of tenants for which service level agreements are enforced at a container level.

11. An apparatus comprising:
    a network interface unit configured to enable communications via a network;
    a memory configured to store logic instructions; and
    a processor, when executing the logic instructions, configured to:
        receive, by a tenant-specific control group from a controller, a data structure including a tuple of information about a specific operational parameter, a tenant identification of a first tenant, and a service identification of a service provided by a software package;
        define, by the tenant-specific control group, a first policy and a second policy different from the first policy, wherein the tenant-specific control group controls resource usage of the software package on a per-tenant basis and defines the first policy based on the data structure;
        apply the first policy for the specific operational parameter when the software package that is running within a container and that is utilized by a plurality of tenants is leveraged by the first tenant of the plurality of tenants, wherein a software container platform hosts the container which runs the software package; and
        apply the second policy for the specific operational parameter when the software package is leveraged by a second tenant of the plurality of tenants.

12. The apparatus of claim 11, wherein the processor is further configured to:
    receive a request from a third tenant of the plurality of tenants to use the software package with a third policy; and
    add the third policy to the tenant-specific control group so that the third policy is applied when the software package is leveraged by the third tenant.

13. The apparatus of claim 12, wherein before adding the third policy to the tenant-specific control group, the processor is configured to:
    determine that infrastructure resources supporting the container can satisfy operating parameters necessitated by the third policy,
    wherein the infrastructure resources include computer resources, network resources, and storage resources.

14. The apparatus of claim 11, wherein the first policy comprises:
    a tenant-specific storage policy that specifies how data associated with the software package is to be stored when the software package is executing for the first tenant.

15. The apparatus of claim 11, wherein the processor is further configured to:
    monitor, by the tenant-specific control group, at least one of enforcement of the first policy, external factors, a workload of the software package, or user input; and dynamically adjust at least one of the first policy or the second policy based on the monitoring.

16. A non-transitory computer-readable storage media encoded with software comprising computer executable instructions and when the software is executed by a processor, the processor is operable to:

receive, by a tenant-specific control group from a controller, a data structure including a tuple of information about a specific operational parameter, a tenant identification of a first tenant, and a service identification of a service provided by a software package;

define, by the tenant-specific control group, a first policy and a second policy different from the first policy, wherein the tenant-specific control group controls resource usage of the software package on a per-tenant basis and defines the first policy based on the data structure;

apply the first policy for the specific operational parameter when the software package that is running within a container and that is utilized by a plurality of tenants is leveraged by the first tenant of the plurality of tenants, wherein a software container platform hosts the container which runs the software package; and apply the second policy for the specific operational parameter when the software package is leveraged by a second tenant of the plurality of tenants.

17. The non-transitory computer-readable storage media of claim 16, wherein the software further comprise instructions that cause the processor to:

receive a request from a third tenant of the plurality of tenants to use the software package with a third policy; and add the third policy to the tenant-specific control group so that the third policy is applied when the software package is leveraged by the third tenant.

18. The non-transitory computer-readable storage media of claim 17, wherein the software further comprise instructions that cause the processor to:

before adding the third policy to the tenant-specific control group, determine that infrastructure resources supporting the container can satisfy operating parameters necessitated by the third policy, wherein the first policy comprises a tenant-specific storage policy that specifies how data associated with the software package is to be stored when the software package is executing for the first tenant.

19. The non-transitory computer-readable storage media of claim 16, further comprising instructions operable to:

monitor, by the tenant-specific control group, at least one of enforcement of the first policy, external factors, a workload of the software package, or user input; and dynamically adjust at least one of the first policy or the second policy based on the monitoring.

* * * * *